Figure 1:
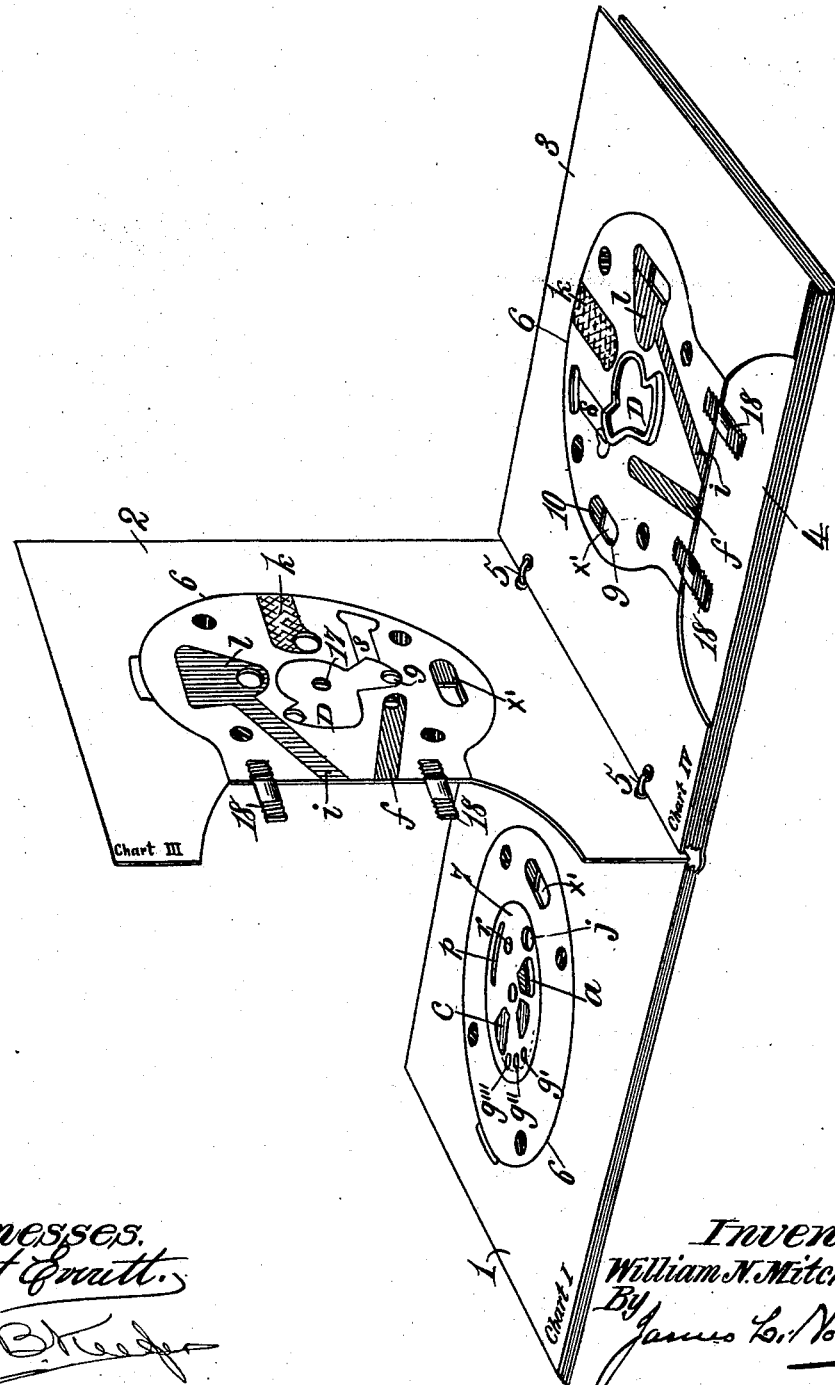

No. 687,570. Patented Nov. 26, 1901.
W. N. MITCHELL.
EDUCATIONAL APPLIANCE.
(Application filed Aug. 7, 1901.)
(No Model.) 2 Sheets—Sheet 1.

Witnesses.
Inventor.
William N. Mitchell.

No. 687,570. Patented Nov. 26, 1901.
W. N. MITCHELL.
EDUCATIONAL APPLIANCE.
(Application filed Aug. 7, 1901.)
(No Model.) 2 Sheets—Sheet 2.
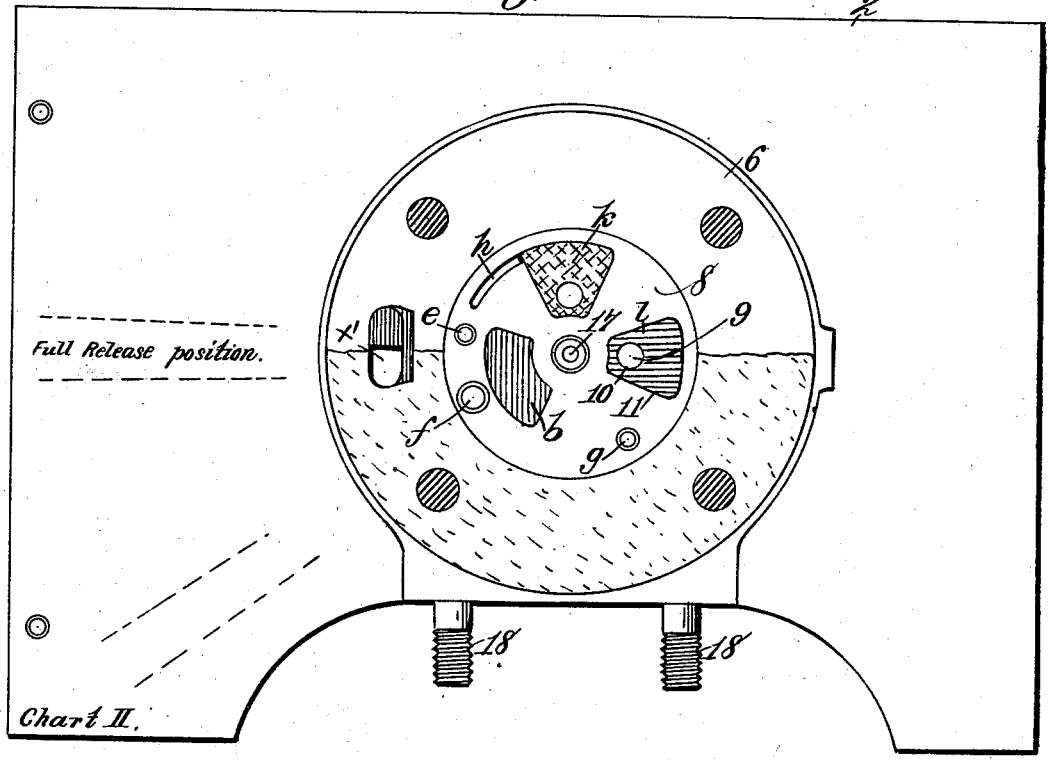
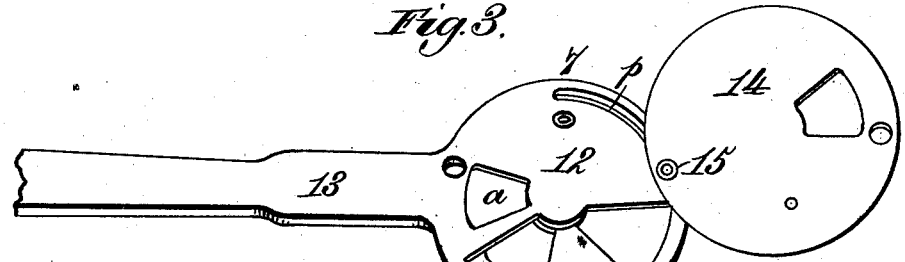
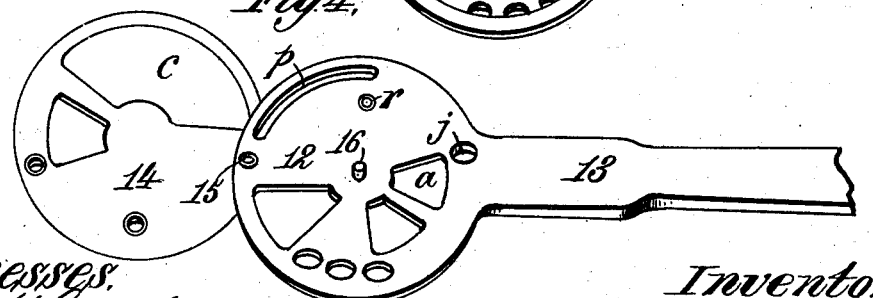
Witnesses.
Robert Everett.
J. B. Keefer.
Inventor.
William N. Mitchell.
By James L. Norris.
Att'y.

UNITED STATES PATENT OFFICE.

WILLIAM N. MITCHELL, OF CHICAGO, ILLINOIS.

EDUCATIONAL APPLIANCE.

SPECIFICATION forming part of Letters Patent No. 687,570, dated November 26, 1901.

Application filed August 7, 1901. Serial No. 71,318. (No model.)

*To all whom it may concern:*

Be it known that I, WILLIAM N. MITCHELL, a citizen of the United States, residing at Chicago, in the county of Cook and State of Illinois, have invented new and useful Improvements in Educational Appliances, of which the following is a specification.

This invention relates to educational appliances, and especially to such appliances for teaching the construction and operation of valved structures; and it has for its object to provide simple, inexpensive, and convenient means for imparting to the pupil in a short, rapid, and easily-understood manner a thorough knowledge of the theory and of the construction and operation of devices of the character referred to.

To these ends my invention consists in a novel chart or series of charts and a novel pattern or model valve to accompany and be used in connection with said charts, by means of which the course followed by the various ports, channels, and ducts can be readily traced and understood.

In the accompanying drawings, forming a part of this specification, Figure 1 is a perspective view showing a series of my improved charts connected together in book form and showing the book opened and one of the leaves elevated to a vertical position. Fig. 2 is a plan view of the chart 2, showing the side opposite to that shown in Fig. 1. Fig. 3 is a perspective view of the pattern or model of the valve, and Fig. 4 is a similar view looking from the under side.

In practice I prepare a series of charts consisting of sheets 1 2 3 4 of paper or cardboard which may conveniently be detachably connected together in book form by tapes and eyelets 5 or in any other well-known or preferred manner. On the opposite sides of each of said sheets are printed or otherwise suitably delineated or portrayed sectional views of the mechanical device the construction and operation of which the charts are designed to teach. In the present instance I have shown, by way of example, a series of charts designed for teaching the construction and operation of an engineer's brake and equalizing discharge-valve, such as in common use to-day on nearly all railways in the United States for controlling the brakes in air-brake systems; but it will be understood that the charts may be prepared and employed for teaching the construction and operation of other valved structures. In the example herein shown and described a sectional view of the casing 6 of the engineer's brake-valve and a bottom view of the rotary valve 7 are printed or otherwise depicted on chart 1. On chart 2 (see Fig. 2) is printed a corresponding view showing the valve-seat 8, on which the valve 7 rests and moves, and a portion of the valve-casing. On the opposite side of the sheet or chart 3 (see Fig. 1) is printed a sectional view of the valve-seat and on the adjacent side of the next sheet or chart 4 is printed a sectional view of that part of the structure that abuts the part shown on chart 3. Corresponding sectional views are made on both sides of the remaining sheets 4. The several sectional views on the charts are all drawn to the same scale and are so arranged on the charts that when the charts are superimposed one upon another the different parts will register precisely as they would in the actual valve which they depict.

In each of the sectional views are illustrated the various ports, channels, and chambers precisely as they would appear in a similar section actually cut through the valve, and when the charts are superimposed upon one another such ports, channels, and the like will assume the same relative positions they would assume in the valve. In order that the passage of the different kinds of air passing through the ports and channels or cavities can be readily followed, all the ports or cavities through which a particular kind of air passes are colored with the same distinctive color. For example, the compressed air from the main reservoir (not shown) is represented as passing through the port $x'$, port $j$, and port $a$, (chart 1,) through the port $x'$, port $f$, and cavity $b$, (chart 2, Fig. 2,) port $x'$ and port $f$, (chart 3, Fig. 1,) and port $x'$ and port $f$, (chart 4,) and these ports and cavities are in practice colored red. The train-pipe air is represented as passing through cavity $c$ and ports $g'$, $g''$, and $g'''$, (chart 1,) port $l$, (chart 2, Fig. 2,) ports $l$ and $i$, (chart 3, Fig. 1,) and ports $l$ and $i$, (chart 4,) and these cavities are all colored yellow. Again, the equalizing reservoir-air is represented as passing through ports *e* and *g* (chart 2, Fig. 2) to the chamber D, (charts 3 and 4,) and port *s*, (chart 4,) and these ports and chamber are colored green. So, also, the air communicating with the atmosphere is shown as passing through groove *p*, (chart 1,) groove *h* and port *k*, (chart 2, Fig. 2,) and port *k*, (charts 3 and 4,) and these grooves and ports are colored orange. The student is thus enabled to readily follow the passage of any particular kind of air through its corresponding set of ports, cavities, grooves, or chambers. In each instance where a port shown on the section delineated on one side of the chart passes through to the port shown in the section on the opposite side of the same chart the port or a portion of that part of the chart on which the port is outlined is punched out or cut entirely through the chart and removed, so that the student can actually see through the port precisely as he would be able to in a corresponding section of the valve itself. Hence when one chart is superimposed upon another the passage of the air through the various ports can be readily traced. As before stated, the true shape and relative dimensions of the ports, chambers, and the like are outlined on the several views on the different charts, and in cutting out or punching the charts to indicate the ports and the like preferably only a portion of the port is punched out or removed, as indicated at 9, thus leaving a portion of the chart within the lines defining the ports uncut or unpunched, as at 10, in order that the representation of the port may be colored to indicate its nature or character. For example, referring to Fig. 2 of the drawings, the port *l* is shown punched out to form a round aperture 9, whereas the said port is shown as being much larger and defined by the line 11, the port being approximately segment-shaped. A portion 10 of the port is thus unremoved from the chart and is colored yellow to indicate that train-pipe air passes therethrough. The same is true of all the ports that are cut through the charts.

From the foregoing it will be readily understood that by means of the colored ports, cavities, grooves, and chambers the passage of the different kinds of air can be readily followed and that by the partially cut or punched out ports the passage of air from one part to another of the valve can be accurately and easily traced.

To enable the student to accurately and quickly understand how the passage of the air through the valve is changed when the rotary valve 7 is turned to different positions, I provide the following means, reference being had to Figs. 3 and 4 of the drawings: Referring to said figures, the numeral 12 indicates a disk provided with a radially-projecting handle 13, which represents the engineer's brake-valve handle. The disk 12 represents the rotary valve 7 (shown in chart 1) and is provided with the same ports *a j r*, cavity *c*, and groove *p*, these parts being colored and partially cut through the disk 12 in the same manner hereinbefore described with reference to the charts. The disk 12 has hinged on its upper side or face a cover 14, which is printed to represent the upper face or top of the rotary valve, and may be conveniently hinged to said disk by an eyelet 15 or similar fastening, whereby the cover may be swung or turned to one side to uncover the ports, cavity, and groove in the disk and expose them to view. On the under side of the cover is printed a representation of the under side of the top of the valve, showing how the cavity *c* and groove *p* are covered, and on the under side of the disk is printed a facsimile of the sectional view shown on chart 1. The disk and its handle and cover constitute a model or pattern of the rotary valve and may be conveniently formed of thick pasteboard, cardboard, or the like. It will be obvious that by placing the pattern or model valve on the chart 2 (shown in Fig. 2) and turning it to the different positions the rotary valve in the brake-valve would be turned to in actual use the student by swinging back the cover 14 can readily perceive by looking through the cut-away ports and the like in the pattern or model the manner in which said ports register with the ports and the like in the valve-seat depicted on the chart and can readily follow the changed relationship between said ports and the like as the valve is shifted from one position to another.

In order to facilitate centering the pattern or model valve on the chart and to form a pivot on which said pattern or model valve may be turned, the latter has fastened centrally in its under side a projecting metallic pin 16, which is adapted to be inserted in a perforation 17, formed in the chart 2 at a point representing the center of the valve-seat 8. The pin and socket represent corresponding parts that are actually formed in the valve as constructed for use.

On charts 2, 3, and 5 (shown in Figs. 1 and 2 of the drawings) are shown two threaded pins or bolts 18, that are represented as projecting from one side of the valve-casing. These bolts in the valve as constructed for use are for the attachment of the feed-valve casing or train-pipe governor, which is not represented on the charts forming a part of the present invention, the purpose being to teach the construction and operation of such governor by a separate series of charts—such, for example, as is shown in a separate application for patent filed by me concurrently with this application. In the chart shown in Figs. 1 and 2 the charts are cut away from about said bolts, so that they simulate actual bolts, and by making corresponding slits in the charts, showing the feed-valve or governor, the bolts 18 may be slipped through said slits, so as to connect the two series of charts together in their proper relative positions.

In practice instructive or descriptive text is printed on the charts describing the parts, their construction and operation, and such other explanatory matter as may be useful in enabling the student to quickly grasp and understand the entire structure.

Having described my invention, what I claim is—

1. An educational appliance for teaching the construction and operation of valved structures, comprising a chart having different sectional views of the valved structure delineated on its opposite faces, said views registering with each other, the corresponding ports and passages in both views being colored alike, and a portion only of each of said ports and passages being cut through and from the chart, whereby the course followed by said ports and passages can be readily traced, substantially as described.

2. An educational appliance for teaching the construction and operation of valved structures, comprising a series of charts each having different sectional views of the valved structure delineated on its opposite faces, all of said views registering with one another when the charts are superimposed one upon the other, the corresponding ports and passages throughout the series of charts being colored alike, and the different ports and passages being colored in contrasting colors, a portion only of said ports and passages being cut through and from the ports, substantially as described.

3. An educational appliance for teaching the construction and operation of valved structures, comprising a series of charts connected together in book form, each of said charts having different sectional views of the valved structure delineated on its opposite faces, the sectional views on adjacent faces of the charts representing sections of the valved structure taken on the same lines, all of said views accurately registering with one another when the sheets are superimposed upon one another and said views having outlined thereon the ports and passages, the corresponding ports and passages in the several views being colored alike and a portion of said ports and passages being cut through and from the charts, the charts being consecutively arranged so that they will progressively illustrate the course followed by the ports and passages, substantially as described.

4. An educational appliance for teaching the construction and operation of valved structures, comprising a chart having delineated thereon a view of a valve-seat and its ports and passages, in combination with a pattern or model valve constructed on the same scale as said view and constructed to register with said view when superimposed thereon, and means for centering said pattern or model valve rotatably on said view, corresponding ports and passages in said view and pattern or model valve being colored alike, and a portion of each of said ports and passages being cut from the chart and pattern or model valve, substantially as and for the purpose specified.

In testimony whereof I have hereunto set my hand in presence of two subscribing witnesses.

WILLIAM N. MITCHELL.

Witnesses:
E. C. KENYON,
A. W. BECKWITH.